United States Patent
Shi

(10) Patent No.: US 8,197,957 B2
(45) Date of Patent: Jun. 12, 2012

(54) BATTERY COVER ASSEMBLY FOR PORTABLE ELECTRONIC DEVICE

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 918 days.

(21) Appl. No.: 12/246,554

(22) Filed: Oct. 7, 2008

(65) Prior Publication Data

US 2010/0009247 A1    Jan. 14, 2010

(30) Foreign Application Priority Data

Jul. 11, 2008   (CN) .......................... 2008 1 0302699

(51) Int. Cl.
*H01M 2/10* (2006.01)

(52) U.S. Cl. .......................................... 429/97; 429/100

(58) Field of Classification Search ............ 429/96–100, 429/121–347; 455/575.1–575.8; 361/814; 320/114; 379/433.08; D14/138
See application file for complete search history.

(56) References Cited

U.S. PATENT DOCUMENTS

| 2,590,804 | A | * | 3/1952 | Vitale | 429/97 |
| 5,694,299 | A | * | 12/1997 | Mori | 361/814 |
| 5,895,729 | A | * | 4/1999 | Phelps et al. | 429/97 |
| 2007/0218961 | A1 | * | 9/2007 | Luo et al. | 455/575.1 |

* cited by examiner

*Primary Examiner* — Basia Ridley
*Assistant Examiner* — James Lee
(74) *Attorney, Agent, or Firm* — Altis Law Group, Inc.

(57) ABSTRACT

A battery cover assembly for a portable electronic device (100), the battery cover assembly includes a cover (10), a housing (20), a button (30) and the at least one elastic element (40). The cover defines a button hole (122). The cover is slidably attached to the housing. The button is disposed on the housing, and is releasably received in the button hole. One end of the at least one elastic element is attached to the housing, and another end of the at least one elastic element is attached to the cover. The at least one elastic element provides an elastic force to allow the cover to automatically slide to open relative to the housing when the button exits from the button hole.

12 Claims, 5 Drawing Sheets

BATTERY COVER ASSEMBLY FOR PORTABLE ELECTRONIC DEVICE

BACKGROUND

1. Field of the Invention

The present invention generally relates to battery cover assemblies and, particularly, to a battery cover assembly for use in a portable electronic device.

2. Description of Related Art

Batteries are widely used in portable electronic devices, such as personal digital assistants (PDAs) and mobile phones. Conventional batteries are attachably received in the electronic device, and battery covers are designed to connect with housings of the electronic devices to enclose the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to allow easy disengagement.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
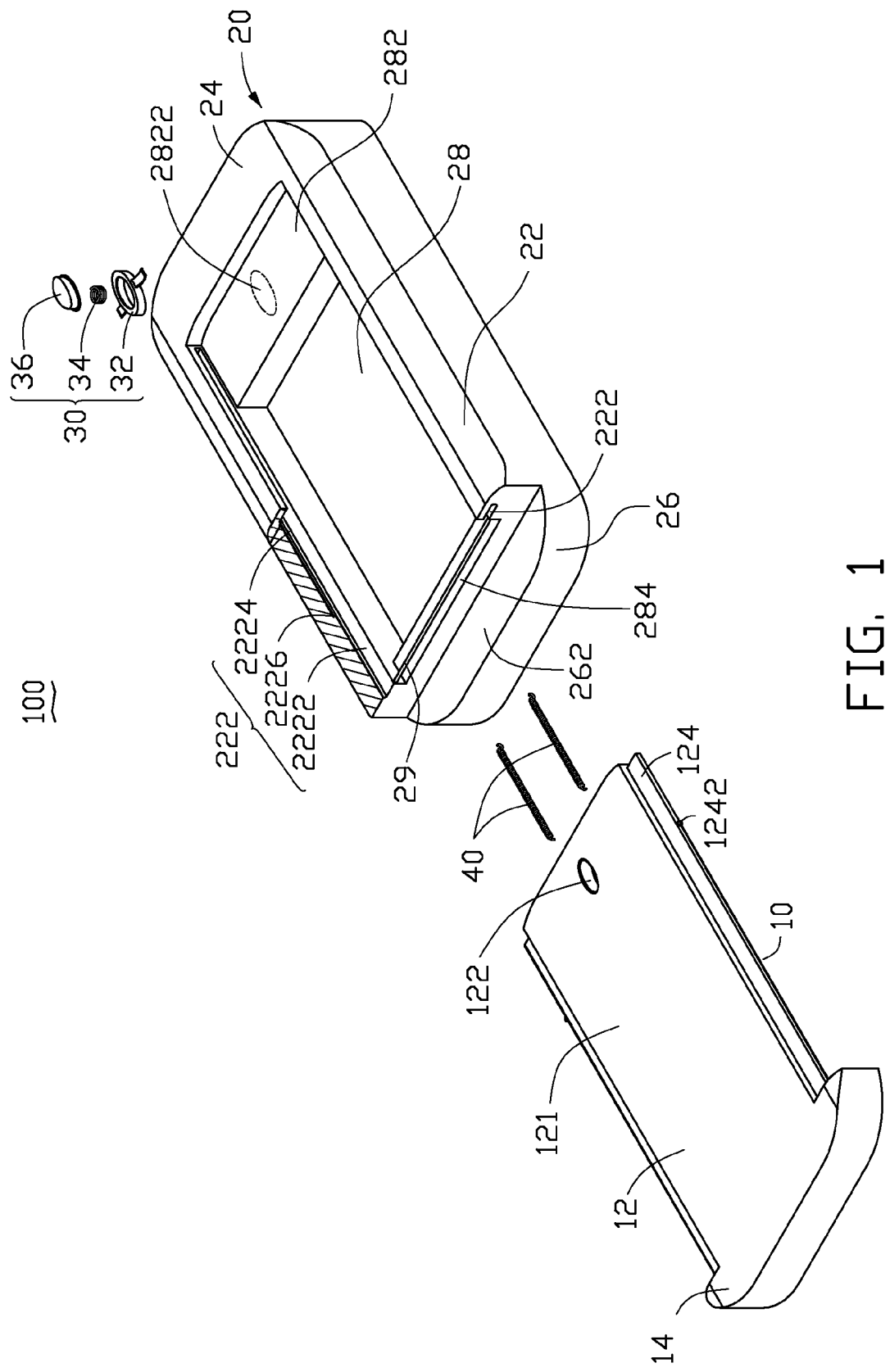
FIG. 1 is an exploded, isometric view of a portable electronic device employing a battery cover assembly in accordance with an exemplary embodiment.

FIG. 1 shows a portable electronic device 100 such as a mobile phone having a battery cover assembly. The mobile phone 100 is an exemplary application, for the purposes of describing details of a battery cover assembly of the exemplary embodiment. The battery cover assembly incorporates a battery cover 10, a housing 20, a button 30, and two first springs 40. The button 30 is configured for releasably latching (i.e. attaching, locking, engaging) the battery cover 10 to the housing 20.

Figure 2:
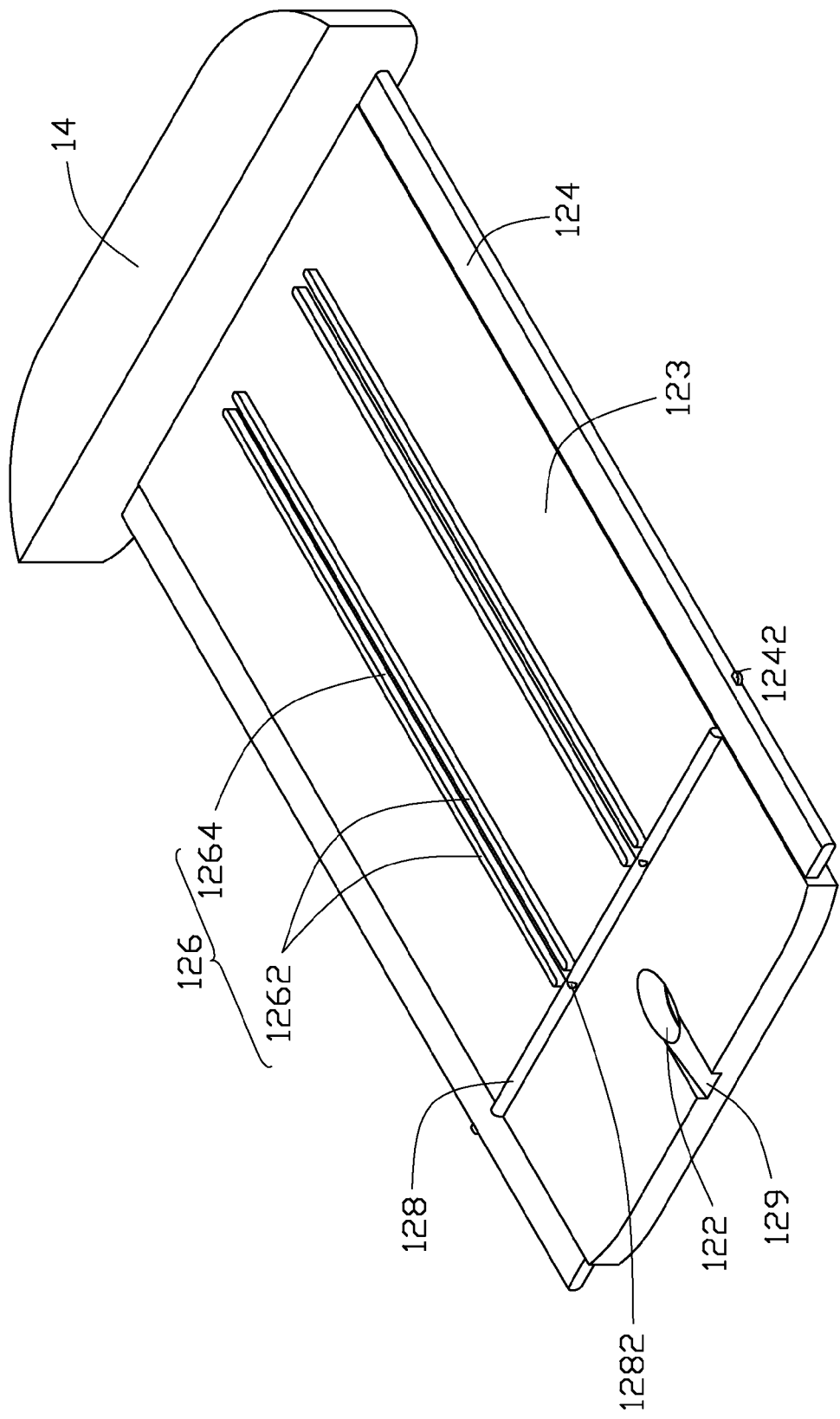
FIG. 2 is an enlarged view of the cover of FIG. 1 from another aspect.

Referring to FIG. 2, the cover 10 is a substantially T-shaped board including a main body 12, and an extending portion 14 positioned at one end of the main body 12. A width and a height of the extending portion 14 are larger than those of the main body 12. The main body 12 includes a top surface 121 and a bottom surface 123. The top surface 121 defines a button hole 122 opposite to the extending portion 14, the button hole 122 communicating with the bottom surface 123. The main body 12 forms two guide rails 124 at two sides thereof. Each guide rail 124 forms an elastic tab 1242 adjacent to the button hole 122. bottom surface 123 of the cover 10 forms two parallel receiving portions 126 for containing the springs 40 along a longitudinal direction thereof. Each receiving portion 126 is made of two ribs 1262. A receiving groove 1264 is defined between the ribs 1262. The bottom surface 123 of the cover 10 further forms a pole 128 along a traverse direction thereof. The pole 128 is disposed at one end of the ribs 1262, and is perpendicular to the ribs 1262. The pole 128 defines two fixed holes 1282 corresponding to the receiving grooves 1264. One end of the first springs 40 is fixedly attached to the fixed holes 1282. The bottom surface 123 defines a sliding groove 129 communicating with the button hole 122 and a distal end of the cover 10. The sliding groove 129 is substantially a wedge, and the depth of the sliding groove 129 gradually increases from one side of the button hole 122 to the other side thereof.

The housing 20 includes two side ends 22, a first end 24 and a second end 26 integrally formed together, and defining a cavity 28 for receiving a battery (not shown) and the cover 10. Each side end 22 defines a guide groove 222 for receiving a corresponding guide rail 124. Each guide groove 222 includes a first groove portion 2222 and a second groove portion 2224. A depth of the second groove portion 2224 is deeper than that of the first groove portion 2222, thereby forming a step 2226 therebetween. The step 2226 is used for stopping the tab 1242. A block 282 is formed adjacent to the first end 24. A beam 284 is formed adjacent to the second end 26 for connecting the two side ends 22. A height of the second end 26 is lower than that of the side ends 22 and the beam 284, thereby forming a receiving room 262. A rod 29 is formed above the beam 284 for connecting the other end of the first springs 40. The block 282 form a receiving area 2822 for latching the button 30.

Figure 3:
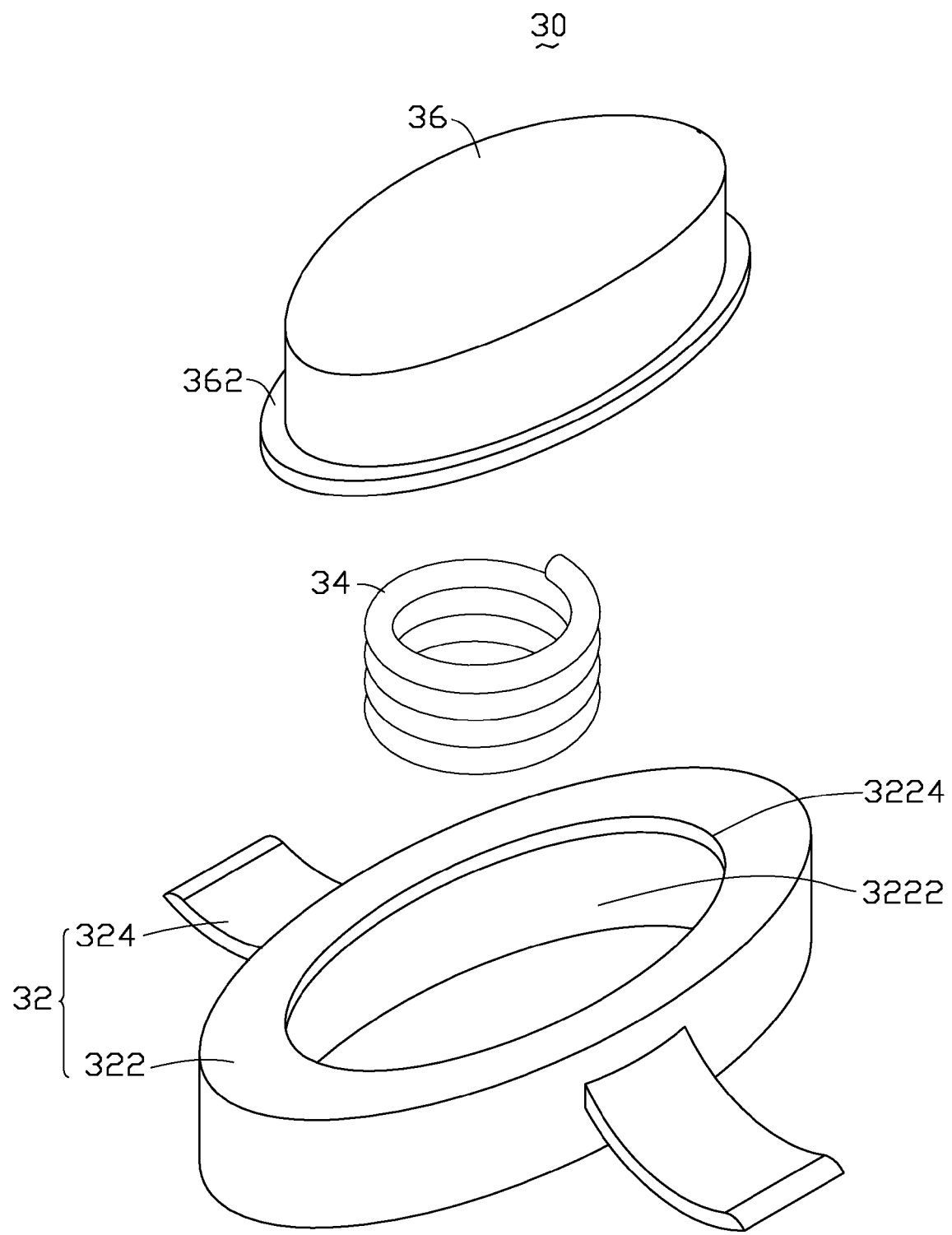
FIG. 3 is an enlarged view of the button of FIG. 1.

Referring to FIG. 3, the button 30 includes a seat 32, a second spring 34 and a cap 36. The seat 32 includes a sleeve portion 322 and two fixed portions 324 formed at two sides of the sleeve portion 322. The sleeve portion 322 defines a through hole 3222 and forms a flange 3224. The fixed portion 324 is a substantially bent sheet for fixing with the receiving area 2822 by melting or adhering or welding. The second spring 34 is a helical spring. The configuration of the cap 36 corresponds to that of the through hole 3222. The cap 36 forms a brim 362 around a peripheral thereof for resisting the flange 3224 of the sleeve portion 322.

Figure 4:
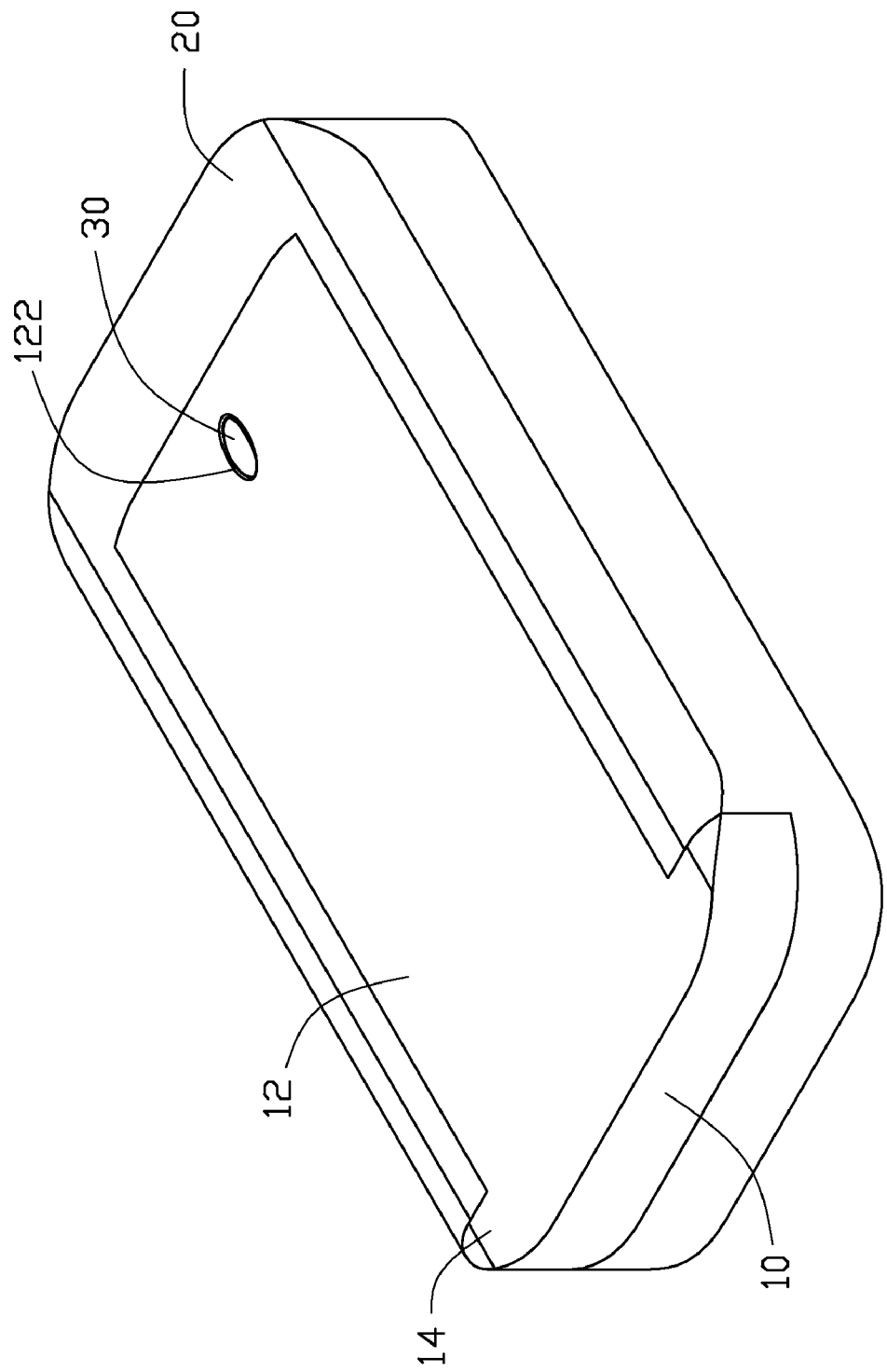
FIG. 4 is an assembled view of the portable electronic device shown in FIG. 1.
Figure 5:
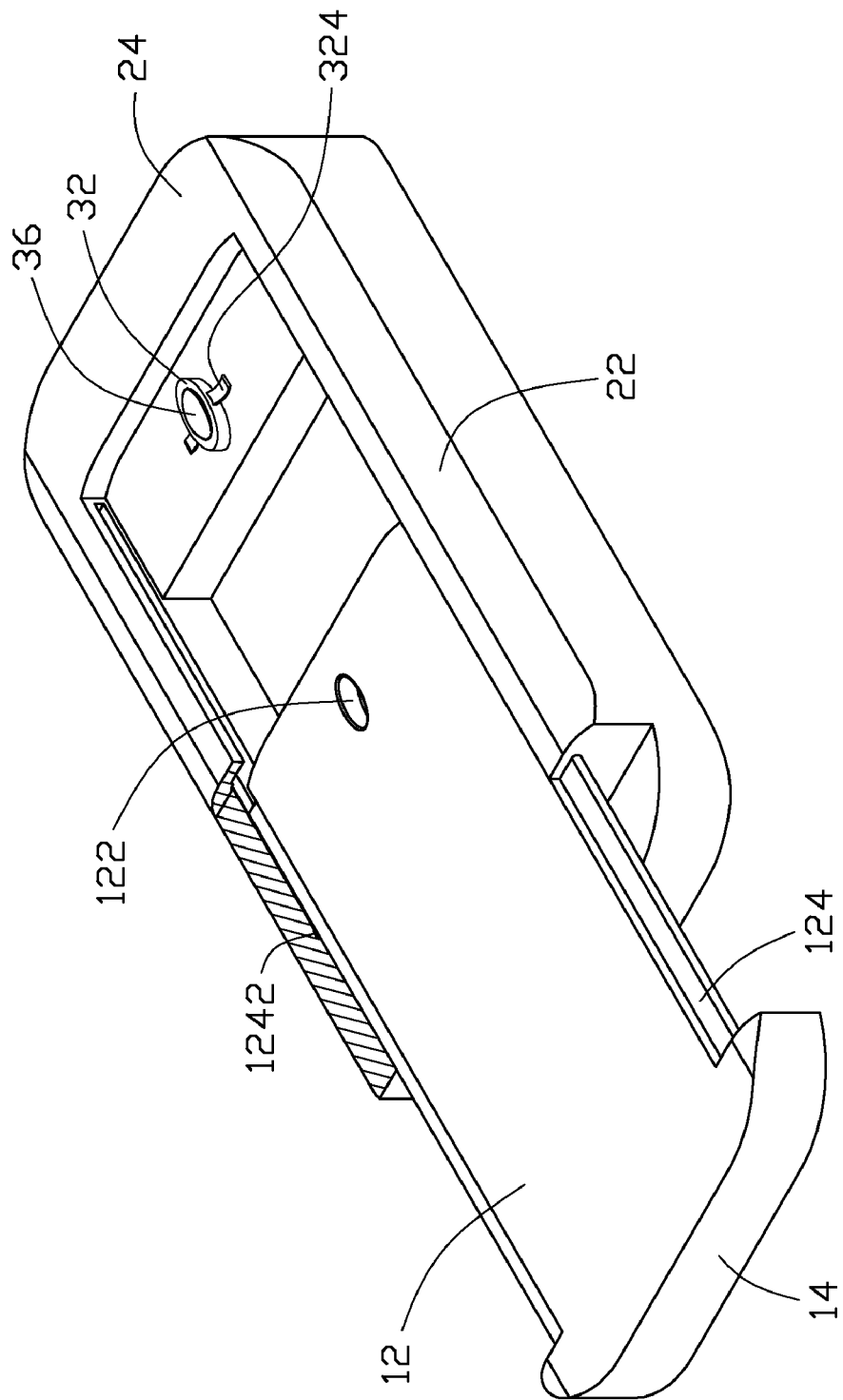
FIG. 5 is an open state view of the portable electronic device of FIG. 3.

During assembly of the battery cover assembly, referring to FIGS. 4 and 5, firstly, the cap 36 is received in the through hole 3222 from one side opposite to the flange 3224. The cap 36 is received in the through hole 3222, and the brim 362 resists the flange 3224. Then, the second spring 34 is received in the through hole 3222 of the sleeve portion 322, and one end of the second spring 34 resists the cap 36. The sleeve portion 322 and the two fixed portions 324 are fixed to the receiving area 2822 of the housing 20 by for example, melting or welding.

Then, the cover 10 is attached to the housing 20. Firstly, one end of the first springs 40 are clasped to the fixed holes 1282. The guide rails 124 of the cover 10 are received in the guide grooves 222. Since the tab 1242 has elastic ability, the tab 1242 may deformedly slide from the first groove portion 2222 to the second groove portion 2224. The first springs 40 are received in the receiving groove 1264, and the other end of the first springs 40 are stretched to clasp the rod 29. The first springs 40 are at a stretched state. The tabs 1242 resist the steps 2226. The battery cover assembly is finished.

To close the cover 10, the cover 10 is pushed toward the first end 24, and the guide rails 24 of the cover 10 slide along the guide grooves 222. The springs 40 are further stretched. When the sliding groove 129 is adjacent to the button 36, the cap 36 firstly contacts the sliding groove 129. The cap 36 is gradually pressed downward to the second spring 34 under the guiding role of the sliding groove 129. When the cap 36 is completely received in the button hole 122, the cap 36 is locked in the button hole 122. The extending portion 14 engages with the receiving room 262 of the second end 26. Therefore, the cover 10 is locked in the housing 20.

Referring to FIG. 5, to open the cover 10, the cap 36 is pressed down by a user's finger until the cap 36 exits from the button hole 122. The cover 10 automatically slides to open relative to the housing 20 by the first springs 40 until the tabs 1242 are stopped by the steps 2226.

As described above, the exemplary embodiment provides a battery cover assembly for portable electronic devices, such as mobile phones. When the button is pushed, the cover of the battery cover assembly can easily slide to open under the role of the first springs. This push-button removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
    a cover defining a button hole and a pole, the pole formed along a first linear direction of the cover;
    a housing, the cover slidably attached to the housing;
    a button disposed on the housing, and releasably received in the button hole; and
    at least one first elastic element arranged on the cover along a second linear direction substantially perpendicular with the first linear direction, one end of the at least one first elastic element attached to the housing, and another end of the at least one first elastic element attached to the pole of the cover;
    wherein the at least one first elastic element provides an elastic force to allow the cover to automatically slide to open relative to the housing when the button exits from the button hole; wherein the first elastic element is a spring, the number of springs is two, and the cover forms two parallel receiving portions for containing the springs along a longitudinal direction thereof, each receiving portion is made of two ribs, and a receiving groove is defined between the ribs, and the spring is received in the receiving groove.

2. The battery cover assembly as claimed in claim 1, wherein the cover forms two guide rails at two sides thereof, the housing defines two guide grooves, and the guide rails are slidably received in the guide grooves.

3. The battery cover assembly as claimed in claim 2, wherein each guide rail forms an elastic tab, each guide groove forms a step for resisting the tab.

4. The battery cover assembly as claimed in claim 1, wherein the pole defines at least one fixed hole, and one end of the at least one first elastic element is fixedly attached to the at least one fixed hole.

5. The battery cover assembly as claimed in claim 4, wherein the housing includes a rod for connecting the other end of the at least one first elastic element.

6. The battery cover assembly as claimed in claim 1, wherein the cover defines a sliding groove communicating with the button hole and a distal end of the cover, and a depth of the sliding groove gradually increases from one side of the button hole to the other side.

7. The battery cover assembly as claimed in claim 1, wherein the button includes a seat, a second elastic element and a cap, the seat is fixed to the housing, the cap is received in the seat, and the second elastic element is disposed between the seat and the cap.

8. The battery cover assembly as claimed in claim 7, wherein the seat includes a sleeve portion and two fixed portions formed at two sides of the sleeve portion, each fixed portion is a bent sheet for fixing with the housing.

9. The battery cover assembly as claimed in claim 8, wherein the cap forms a brim around a peripheral thereof, and the sleeve portion defines a through hole and forms a flange, the cap is received in the through hole, and the brim of the cap resists the flange of the sleeve portion, the second elastic element is a helical spring, and is received in the through hole.

10. A portable electronic device comprising:
    a cover defining a button hole and forming a pole and two guide rails;
    a housing including a rod, and defining two guide grooves for slidabley receiving the guide rails;
    a button disposed on the housing, and releasably received in the button hole; and
    at least one first elastic element, one end of the at least one first elastic element attached to the pole, the other end of the at least one first elastic element connected to the rod and providing an elastic force to allow the cover to automatically slide to open relative to the housing when the button exits from the button hole.

11. The portable electronic device as claimed in claim 10, wherein the cover defines a sliding groove communicating with the button hole and a distal end of the cover, and a depth of the sliding groove gradually increases from one side of the button hole to the other side.

12. The portable electronic device as claimed in claim 10, wherein the button includes a seat, a second elastic element and a cap, the seat is fixed to the housing, the cap is received in the seat, and the second elastic element is disposed between the seat and the cap.

* * * * *